B. C. AMES.

UNBREAKABLE CONCAVO-CONVEX COMPRESSION CRYSTAL.

APPLICATION FILED MAY 12, 1917.

Reissued Apr. 9, 1918. 14,458.

INVENTOR.
Bliss C. Ames

BY

Hubbard

ATTORNEY.

UNITED STATES PATENT OFFICE.

BLISS C. AMES, OF WALTHAM, MASSACHUSETTS, ASSIGNOR TO THE E. INGRAHAM CO., OF BRISTOL, CONNECTICUT, A CORPORATION.

UNBREAKABLE CONCAVO-CONVEX COMPRESSION-CRYSTAL.

14,458. Specification of Reissued Letters Patent. Reissued Apr. 9, 1918.

Original No. 1,133,780, dated March 30, 1915, Serial No. 8,603, filed February 16, 1915. Application for reissue filed May 12, 1917. Serial No. 168,265.

*To all whom it may concern:*

Be it known that I, BLISS C. AMES, a citizen of the United States, residing at Waltham, in the county of Middlesex and State of Massachusetts, have invented a new and useful Improvement in Unbreakable Concavo-Convex Compression-Crystals; and I do hereby declare the following, when taken in connection with the accompanying drawings and the characters of reference marked thereon, to be a full, clear, and exact description of the same, and which said drawings, showing one embodiment of the invention, constitute part of this application, and represent, in—

Figure 1:
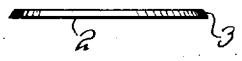

Figure 1 an edge view of an unbreakable crystal constructed in accordance with my invention and shown prior to being placed under compression.

Figure 2:
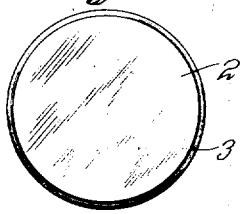

Fig. 2 a plan view thereof.

Figure 3:
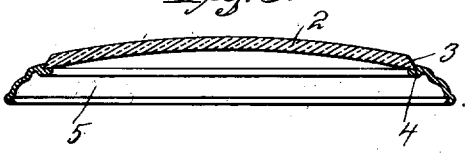

Fig. 3 a view on an enlarged scale in transverse section of an unbreakable crystal constructed and applied in accordance with my invention.

The object of my invention is to produce at a low cost an unbreakable or elastic compression crystal.

With this end in view, my invention consists in an unbreakable elastic concavo-convex crystal maintained under compression in a supporting ring such as a bezel.

In carrying out my invention as herein shown, I employ a beveled disk 2 of celluloid or other equivalent elastic transparent unbreakable material, the normal diameter of which is a trifle larger when the disk is in its passive or flat state, than the diameter of the undercut groove 4 of the bezel 5 so that the crystal 2 cannot be introduced into the groove of the bezel until it has been reduced in diameter by springing it into concavo-convex form. When so sprung, its edge is introduced into the groove 4 after which the means applied to the disk to spring it into concavo-convex form are released. The disk then immediately recovers itself sufficiently to seat its beveled edge firmly in the bottom of the groove 4, the compression strain thus set up, holding it in place and at all times compensating for contraction of the disk resulting from the shrinkage due to the seasoning of the celluloid. Inasmuch as the disk is always under compression, its edges will always be crowded into the groove of the bezel and, therefore, so tightly fitted therein as to prevent the entrance of any dust or other foreign particles around the edge of the disk.

I am aware that the use of celluloid in the place of glass for watch crystals has been proposed and I do not broadly claim the idea, but only my specific crystal made larger in diameter than the supporting ring and thrown into concavo-convex form for its introduction into and retention in the ring.

In accordance with the provisions of the patent statutes I have described the principle of operation of my invention, together with the structure which I now consider represents one practical embodiment thereof. But I desire to have it understood that the device shown is only illustrative, and that in some particulars the invention can be carried out in other ways.

I claim as my invention:

1. The combination with a rigid supporting ring, of an elastic crystal normally flat and larger in diameter than said ring, supported thereby in concavo-convex form under compression.

2. The combination with a supporting ring formed with an annular groove, of a celluloid crystal larger in diameter than the diameter of the said groove into which its edge is inserted after it has been forced into concavo-convex form and thus reduced in virtual diameter to the diameter of said groove whereby the crystal is maintained under compression in concavo-convex form and so firmly held in place.

3. The combination with a watch bezel formed with an annular groove, of a celluloid watch-crystal larger in diameter than the diameter of the said groove into which its edge is inserted after it has been forced into concavo-convex form and thus reduced in virtual diameter to the diameter of said groove, whereby the crystal is maintained under compression in concavo-convex form and so firmly held in place.

4. A crystal of elastic material distorted by flexure from its normal form into concavo-convex form, and a rigid supporting ring provided with a crystal receiving portion, smaller in diameter than the normal diameter of said crystal and upon which it is mounted while distorted and by it is maintained in concavo-convex form under uniform radial compression strains.

5. The combination with a rigid supporting ring of an elastic crystal normally flat and substantially larger in diameter than said ring; said crystal being uniformly reduced in diameter by distortion into concavo-convex form to be received and supported by said ring, by means of which it is maintained in concavo-convex form under uniform radial compression strains.

BLISS C. AMES.